(12) United States Patent  (10) Patent No.: US 8,856,192 B2
Choi et al.  (45) Date of Patent: Oct. 7, 2014

(54) METHOD AND APPARATUS FOR UPDATING COMPOSITION DATABASE BY USING COMPOSITION PATTERN OF USER, AND DIGITAL PHOTOGRAPHING APPARATUS

(75) Inventors: Myung-kyu Choi, Suwon-si (KR); Ung-sik Kim, Suwon-si (KR); Ji-hyun Goh, Seongnam-si (KR); Won-seok Song, Anyang-si (KR); Hyun-ock Yim, Seoul (KR); Tae-hoon Kang, Seoul (KR); Eun-sun Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 763 days.

(21) Appl. No.: 12/822,378

(22) Filed: Jun. 24, 2010

(65) Prior Publication Data

US 2010/0332553 A1  Dec. 30, 2010

(30) Foreign Application Priority Data

Jun. 24, 2009  (KR) ........................ 10-2009-0056531

(51) Int. Cl.
G06F 17/30 (2006.01)
H04N 1/00 (2006.01)
G06T 11/60 (2006.01)
H04N 5/232 (2006.01)
H04N 101/00 (2006.01)

(52) U.S. Cl.
CPC ...... *G06F 17/30256* (2013.01); *H04N 1/00183* (2013.01); *G06T 11/60* (2013.01); *H04N 5/23222* (2013.01); *H04N 2101/00* (2013.01); *H04N 5/23293* (2013.01)
USPC ........................................................ 707/803

(58) Field of Classification Search
CPC .................... G06T 11/60; G06T 2207/10016; G06T 11/00; G06T 11/203; G06T 13/40; G06T 13/80; G06T 2207/20021; G06T 2207/30244; G06T 2207/30256; G06T 3/4053; G06T 7/0002; G06T 7/0024; G06T 7/2033; G06T 2210/61; G06T 17/30256
See application file for complete search history.

(56) References Cited

U.S. PATENT DOCUMENTS 5,668,897 A * 9/1997 Stolfo ..................... 707/E17.02
5,748,780 A * 5/1998 Stolfo .................. 707/E17.023
7,340,079 B2 * 3/2008 Segawa et al. ................ 382/118

(Continued)

FOREIGN PATENT DOCUMENTS

JP  2005-236509  9/2005
JP  2008-288881  11/2008
KR  1020080044132  5/2008

*Primary Examiner* — Debbie Le
(74) *Attorney, Agent, or Firm* — Drinker Biddle & Reath LLP

(57) ABSTRACT

A method and apparatus update a composition database for storing information for setting a composition. The method includes extracting and displaying at least one composition stored in the composition database, counting a composition selected by a user from among the at least one composition, and updating the composition database according to the result of the count. According to the method, compositions selected by a user from among compositions displayed on a screen are counted, and the result of the count is reflected on the composition database. Accordingly, compositions are displayed in a user-centered manner and photographing convenience is increased, a digital photographing apparatus automatically learns compositions preferred by a user during photographing so as to automatically display the compositions preferred by the user, and a composition based on a pattern of the user is suggested instead of a composition according to a certain place or scene.

19 Claims, 10 Drawing Sheets

(56) References Cited

U.S. PATENT DOCUMENTS

| | | | |
|---|---|---|---|
| 8,285,085 B2* | 10/2012 | Manico et al. | 382/325 |
| 8,311,336 B2* | 11/2012 | Sakamoto et al. | 382/190 |
| 8,488,909 B2* | 7/2013 | Endo | 382/284 |
| 8,582,891 B2* | 11/2013 | Yim et al. | 382/201 |
| 2002/0186867 A1* | 12/2002 | Gutta et al. | 382/116 |
| 2003/0228056 A1* | 12/2003 | Prakash et al. | 382/173 |
| 2004/0109587 A1* | 6/2004 | Segawa et al. | 382/115 |
| 2004/0174434 A1* | 9/2004 | Walker et al. | 348/211.3 |
| 2005/0179791 A1 | 8/2005 | Iga | |
| 2007/0019261 A1* | 1/2007 | Chu | 358/540 |
| 2008/0215984 A1* | 9/2008 | Manico et al. | 715/730 |
| 2009/0274370 A1* | 11/2009 | Sakamoto et al. | 382/190 |
| 2012/0069051 A1* | 3/2012 | Hagbi et al. | 345/633 |
| 2013/0002903 A1* | 1/2013 | Manico et al. | 348/231.6 |

\* cited by examiner

| USER | COMPOSITION 1 | COMPOSITION 2 | COMPOSITION 3 | COMPOSITION 4 |
|---|---|---|---|---|
| A | 30 | 10 | 3 | 7 |
| B | 10 | 23 | 15 | 4 |
| C | 22 | 10 | 6 | 5 |
| D | 7 | 3 | 10 | 1 |

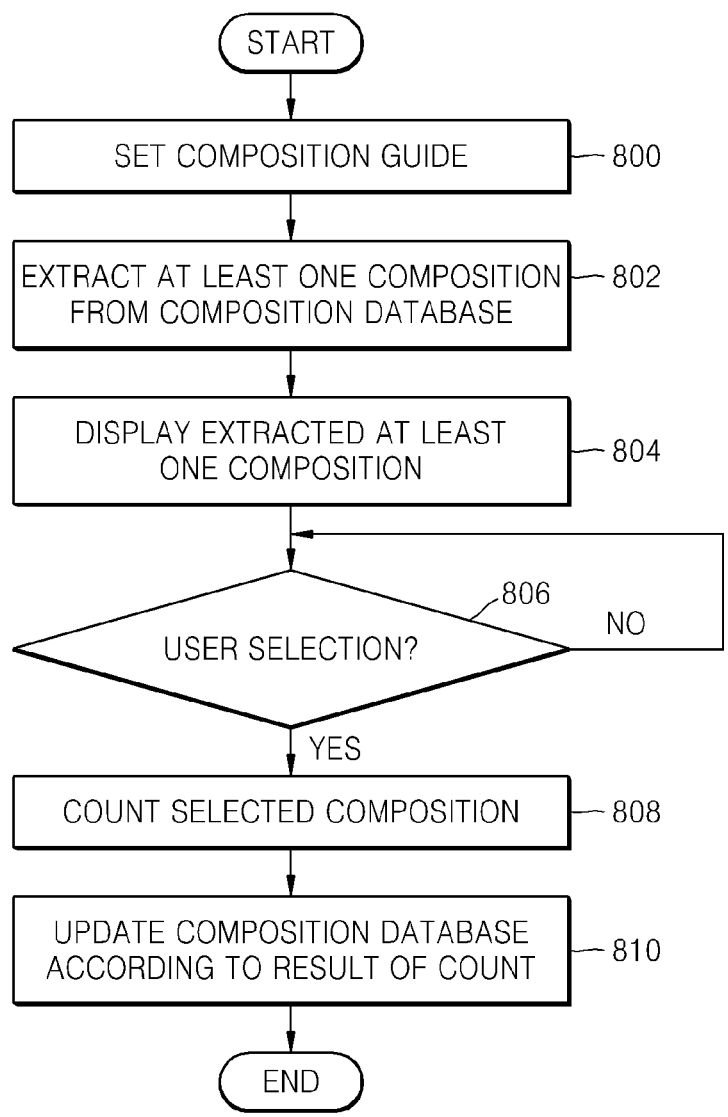

METHOD AND APPARATUS FOR UPDATING COMPOSITION DATABASE BY USING COMPOSITION PATTERN OF USER, AND DIGITAL PHOTOGRAPHING APPARATUS

RELATED APPLICATIONS

This application claims the priority benefit of Korean Patent Application No. 10-2009-0056531, filed on Jun. 24, 2009, in the Korean Intellectual Property Office, the disclosure of which is incorporated herein in its entirety by reference.

BACKGROUND

1. Field

One or more embodiments relate to controlling photographing, and more particularly, to a method and apparatus for updating a composition database that stores information for setting a composition, and a digital photographing apparatus.

2. Description of the Related Art

A photographer may choose a composition, i.e., how to organize compositions on a screen. In order to form a suitable composition, a screen organization may be synthetically considered, such as a line, a shape, a hue, brightness, texture, weight on a main subject and peripheral elements, a distance, a direction, and a motion status.

SUMMARY

One or more embodiments include a method and apparatus for updating a composition database, wherein a composition preferred by a user may be automatically suggested as a digital photographing apparatus automatically learns the composition preferred by the user so as to enlarge a composition representation and increase a photographing convenience of the user, and a composition according to a certain place or scene is suggested based on a composition pattern of the user.

One or more embodiments include a digital photographing apparatus, which automatically determines a composition pattern of the user without a user having to pre-assign preferred compositions, reduces a trouble of the user having to manually set a composition according to circumstances, and obtains an image that is to the user's taste and is almost perfect in a short time.

Additional aspects will be set forth in part in the description which follows and, in part, will be apparent from the description, or may be learned by practice of the presented embodiments.

According to one or more embodiments, a method of updating a composition database for storing information for setting a composition includes: extracting and displaying at least one composition stored in the composition database; counting a composition selected by a user from among the at least one composition; and updating the composition database according to the result of the count.

The updating may include changing an arranged order of the at least one composition stored in the composition database in an order of a composition having the highest count result to a composition having the lowest count result.

In the extracting and displaying, the at least one composition may be displayed according to the changed arranged order.

In the extracting and displaying, a composition having the highest count result may be displayed as a representative composition.

In the extracting and displaying, the remaining compositions, excluding the composition having the highest count result, may be displayed as sub-compositions.

The method may further include detecting scene information from an input image, and recognizing a scene of the input image by using the detected scene information, wherein, in the extracting and displaying, at least one composition corresponding to the recognized scene may be extracted from the composition database and displayed.

In the updating, an arranged order of compositions according to a scene in the composition database may be updated according to the result of the count.

The method may further include selecting a certain user by assigning a user or by using a predetermined user recognizing device, wherein, in the extracting and displaying, at least one composition corresponding to the selected user may be extracted from the composition database and displayed.

In the updating, an arranged order of compositions according to a user in the composition database may be updated according to the result of the count.

The method may further include selecting a certain user by assigning a user or by using a predetermined user recognizing device, wherein, in the extracting and displaying, at least one composition corresponding to the recognized scene and the selected user may be extracted from the composition database and displayed.

In the updating, an arranged order of compositions according to a scene and according to a user in the composition database may be updated according to the result of the count.

The method may further include: selecting another composition other than the displayed at least one composition, wherein the selecting is performed by the user, and displaying the other selected composition; and registering the other displayed composition in the composition database.

According to one or more embodiments, an apparatus for updating a composition database for storing information for setting a composition includes: a controller that stores and displays at least one composition stored in the composition database, and counts a composition selected by a user from among the at least one composition; and a composition updater that updates the composition database according to the result of the count.

The composition updater may change an arranged order of the at least one composition stored in the composition database in an order of a composition having the highest count result to a composition having the lowest count result.

The controller may display the at least one composition in the changed arranged order.

The controller may display the composition having the highest count result as a representative composition, and display remaining compositions, excluding the composition having the highest count result, as sub-compositions.

The apparatus may further include a scene recognizer that detects scene information from an input image and recognizes a scene of the input image by using the detected scene information, wherein the controller extracts at least one composition corresponding to the recognized scene and displays the extracted at least one composition.

The controller, when a certain user is selected by assigning a user or by using a predetermined user recognizing device, may extract at least one composition corresponding to the selected user from the composition database and display the extracted at least one composition.

According to one or more embodiments, a digital photographing apparatus includes the apparatus for updating a composition database for storing information for setting a composition.

According to one or more embodiments, a non-transient computer readable storage medium may have stored thereon a program executable by a processor for performing the method of updating a composition database for storing information for setting a composition.

BRIEF DESCRIPTION OF THE DRAWINGS

These and/or other aspects will become apparent and more readily appreciated from the following description of the embodiments, taken in conjunction with the accompanying drawings of which:

FIG. 8 is a flowchart illustrating a method of updating a composition database, according to an embodiment.

DETAILED DESCRIPTION

Reference will now be made in detail to embodiments, examples of which are illustrated in the accompanying drawings. Also, while describing the embodiments, detailed descriptions about related well-known functions or configurations that may diminish the clarity of the points of the embodiments are omitted.

Terms or words used herein shall not be limited to having common or dictionary meanings, and have the meanings corresponding to technical aspects of the embodiments so as to most suitably express the embodiments.

Figure 1:
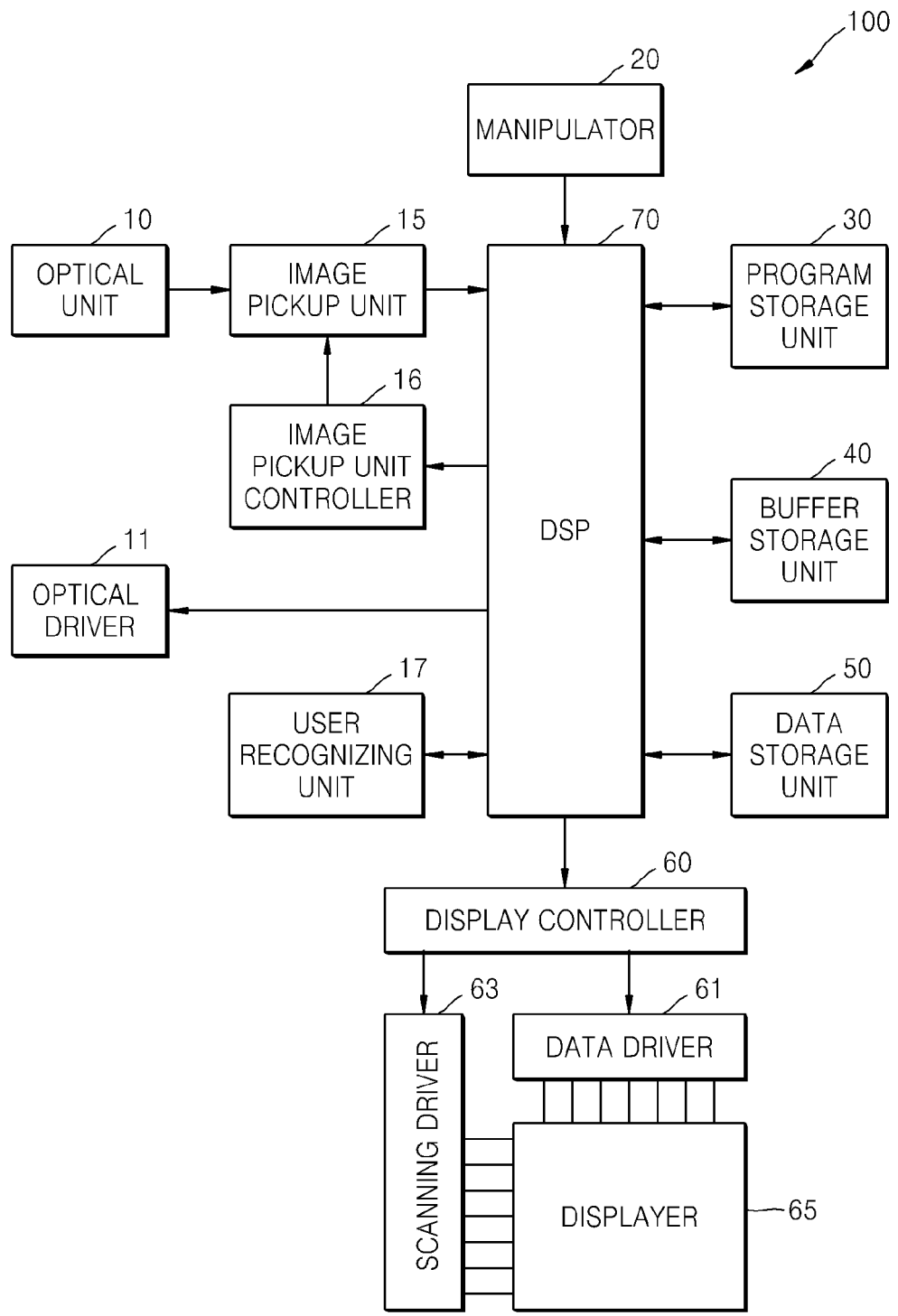
FIG. 1 is a block diagram schematically illustrating a digital camera, as an example of a digital photographing apparatus, according to an embodiment.
Figure 2:
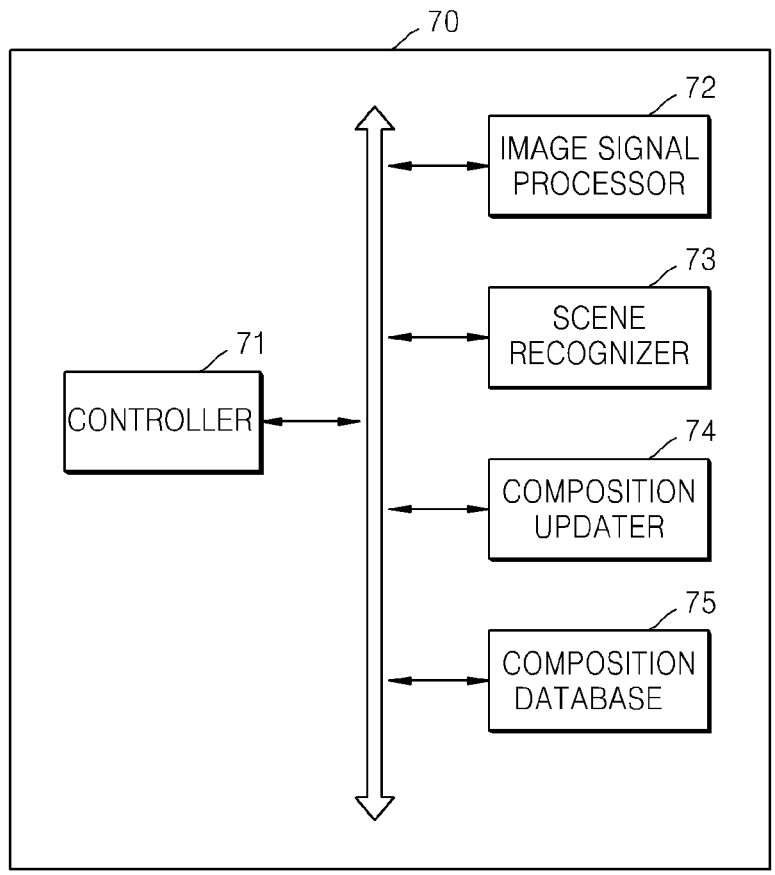
FIG. 2 is a block diagram illustrating in detail a digital signal processor of FIG. 1.

FIG. 1 is a block diagram schematically illustrating a digital camera 100, as an example of a digital photographing apparatus, according to an embodiment, and FIG. 2 is a block diagram illustrating in detail a digital signal processor (DSP) 70 of FIG. 1.

Referring to FIG. 1, the digital camera 100 includes an optical unit 10, an optical driver 11, an image pickup unit 15, an image pickup unit controller 16, a user recognizing unit 17, a manipulator 20, a program storage unit 30, a buffer storage unit 40, a data storage unit 50, a display controller 60, a data driver 61, a scanning driver 63, a displayer 65, and the DSP 70.

The optical unit 10 receives an optical signal from a subject, and transmits the optical signal to the image pickup unit 15. The optical unit 10 may include at least one lens, such as a zoom lens for narrowing or widening a viewing angle according to a focal length, or a focus lens for adjusting a focus on the subject. The optical unit 10 may further include an iris for adjusting light intensity.

The optical driver 11 adjusts a location of the at least one lens or the opening and closing of the iris. A focus may be adjusted by moving the location of the at least one lens, and light intensity may be adjusted by opening and closing the iris. The optical driver 11 controls the optical unit 10 according to a control signal that is automatically generated by an image signal input in real time or that is manually input by a user.

The optical signal transmitted from the optical unit 10 to the image pickup unit 15 forms an image of the subject on a light-receiving surface of the image pickup unit 15. The image pickup unit 15 may include a charge-coupled device (CCD) or a complementary metal oxide semiconductor image sensor (CIS) that converts the optical signal into an electric signal. The image pickup unit controller 16 may adjust sensitivity or the like of the image pickup unit 15. The image pickup unit controller 16 may control the image pickup unit 15 according to a control signal that is automatically generated by an image signal input in real time or that is manually input by the user.

The user recognizing unit 17 is an image input device to which user identification information, such as face data, may be input. For example, the at least one lens included in the optical unit 10 may rotate to operate as the user recognizing unit 17. Alternatively, the user recognizing unit 17 may include a separate lens. The user identification information input to the user recognizing unit 17 is transmitted to the DSP 70. The DSP 70 identifies the user by using face information of the user, and may display composition information according to the identified user.

The manipulator 20 may receive a control signal from the outside of the digital camera 100, such as from the user. The manipulator 20 may include a shutter-release button that can be pressed to generate a shutter-release signal to capture an image by exposing the image pickup unit 15 to light for a predetermined time, a power supply button that can be pressed to supply power to the digital camera 100, a pantoscopic-zoom button and a telescopic-zoom button that can be pressed to widen or narrow a viewing angle, and other buttons that can be pressed to perform various functions, such as selecting a mode like a character inputting mode, a photographing mode, a reproduction mode, selecting a white balance setting function, and selecting an exposure setting function. The manipulator 20 may include various buttons as described above, but is not limited thereto, and may be realized in various forms that can be manipulated by the user, such as a keyboard, a touch pad, a touch screen, or a remote controller.

Also, the digital camera 100 further includes the program storage unit 30 for storing a program such as an operating system for operating the digital camera 100 or an application system, the buffer storage unit 40 for temporarily storing data used during operation of the digital camera 100 or result data of the operation, and the data storage unit 50 for storing various types of information required for a program, including an image file and an image signal.

Moreover, the digital camera 100 includes the display controller 60 for displaying an operating status of the digital camera 100 or an image captured by the digital camera 100, the data driver 61 and the scanning driver 63 for transmitting display data received from the display controller 60, and the displayer 65 for displaying a predetermined image according to a signal received from the data driver 61 and the scanning driver 63. The displayer 65 may be formed of a liquid crystal display (LCD) panel, an organic light emitting display (OLED) panel, or an electrophoresis display (EPD) panel.

Also, the displayer 65 displays a scene to which an input image, such as a preview image, corresponds using a certain scene icon, according to the control of the DSP 70. The displayer 65 also displays composition icons corresponding to compositions suitable for the input image. Also, the displayer 65 displays a representative composition, a lattice, or both of the representative composition and the lattice with the input image.

The digital camera 100 includes the DSP 70 for processing a received image signal, and controlling each element according to the received image signal or an external input signal.

The DSP 70 will now be described in detail with reference to FIG. 2.

Referring to FIG. 2, the DSP 70 includes a controller 71, an image signal processor 72, a scene recognizer 73, a composition updater 74, and a composition database 75. Here, the DSP 70 may include an apparatus for updating a composition database.

The controller 71 controls overall operations of the DSP 70.

The image signal processor 72 converts an image signal received from the image pickup unit 15 into a digital signal, and performs an image signal process, such as gamma correction, color filter array interpolation, color matrix, color correction, or color enhancement, so that the image signal is converted according to the viewing angle of a person. Also, the image signal processor 72 may perform an auto white balance algorithm or an auto exposure algorithm, when an auto white balance function or an auto exposure function is set. The image signal processor 72 generates an image file having a predetermined format by adjusting and compressing a size of image data with a scaler. Alternatively, the image signal processor 72 decompresses a compressed image file. The image signal processor 72 may perform the image signal process as above on an image signal received in real time in a live-view mode before photographing, or an image signal received by a shutter-release signal. Here, a different image signal process may be performed on each image signal.

The scene recognizer 73 detects scene information of an input image, and recognizes a scene of the input image by using the detected scene information. Here, the input image denotes an image received through the digital camera 100, and a preview image before taking a photograph. Also, the scene information denotes information indicating features of a corresponding scene. For example, the scene information may include a face of a person in the input image, the brightness of the input image, the illuminance of a subject, or a distance of the subject. The scene recognizer 73 detects the face using a face-detecting module (not shown) or detects the scene information by measuring the illuminance of the subject. Also, the scene recognizer 73 may also recognize the scene information by using a related scene detecting or analyzing method.

By determining the scene, the scene recognizer 73 determines whether the input image is an image of a person or scenery, an image of a person or scenery taken at night, an image taken against the light, or the like. In other words, the scene recognizer 73 determines the input image as an image of a person when scene information including a face of a person is detected, determines whether the input image has been taken against the light based on an illuminance value of a subject, and determines whether the input image has been taken at night based on a brightness value of the input image.

The controller 71 extracts composition information according to a scene, such as a scenery, a night view, or a backlight, recognized by the scene recognizer 73, from the composition database 75. Here, the composition information generally denotes an arrangement of subjects, and includes a circular composition, a triangular composition, a diagonal composition, a golden sectional composition, a radial composition, an S-shaped composition, a parallel lined composition, a tri-sectional composition, a checker composition, a horizontal and perpendicular composition, and other compositions set by the user.

Also, the controller 71 extracts at least one composition suitable for a scene of the input image from among the compositions stored in the composition database 75, and displays the extracted composition on the displayer 65 via the display controller 60. When a plurality of compositions are displayed, the compositions may be displayed according to a preference of the user. Accordingly, the user may select the composition to be photographed.

The controller 71 extracts at least one composition stored in the composition database 75 and displays the extracted at least one composition. Also, when the user selects a certain composition from among the at least one composition, the controller 71 counts the selected composition, and updates the composition database 75 with the result of the count via the composition updater 74.

The controller 71 may assign a user so that the composition database 75 is updated according to the user. Also, aside from manually assigning the user, the user may be automatically recognized by using a predetermined user recognizing device, and thus compositions stored in the composition database 75 of the recognized user are displayed. Here, the predetermined user recognizing device is an image input device to which face data of the user is input. The user may be identified by using face information of the user by rotating the at least one lens of the optical unit 10, or by using a separate lens, and compositions according to the identified user may be displayed.

The composition updater 74 may prepare a database of user selections or a composition using a pattern of the user by changing and then storing an arranged order of compositions stored in the composition database 75 from a composition having the highest count result to a composition having the lowest count result, according to the control of the controller 71. In other words, compositions used during photographing are internally counted, and a composition that is most frequently used may be displayed first.

The composition updater 74 updates an arranged order of compositions according to a scene and user in the composition database 75 according to the count result of the controller 71.

The controller 71 preferentially displays the composition having the highest count result as a representative composition, and displays the remaining compositions in decreasing order of count results as sub-compositions. Accordingly, the user may capture an image by selecting a composition from among the representative composition and sub-compositions, thereby increasing convenience to the user.

The composition database 75 stores compositions used while capturing an image, such as a circular composition, a triangular composition, a diagonal composition, a golden sectional composition, a radial composition, an S-shaped composition, a parallel lined composition, a tri-sectional composition, a checker composition, a horizontal and perpendicular composition, and other compositions set by the user. Also, the composition database 75 may arrange and store compositions preferred by the user according to a scene, or compositions preferred by each user.

Here, an element for updating the composition database 75 updates the composition database 75 according to a scene and a plurality of users, but an element that prepares a database of compositions selected according to a scene or a plurality of users is selectively included in the digital camera 100.

Figure 3:
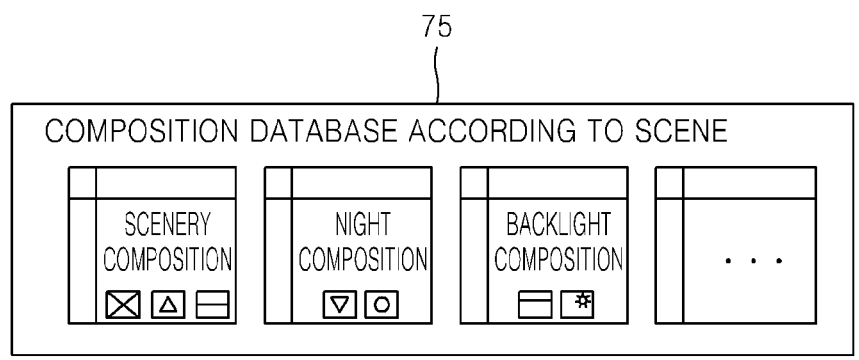
FIG. 3 is a diagram for describing composition information according to a scene, stored in a composition database of FIG. 2.

FIG. 3 is a diagram for describing composition information according to a scene, stored in the composition database 75 of FIG. 2. The composition database 75 stores compositions according to a scene, such as a scenery composition, a night composition, and a backlight composition. As illustrated in FIG. 3, the scenery composition includes a diagonal composition, a triangular composition, and a parallel lined composition, the night composition includes an inverted triangular composition and a circular composition, and the backlight composition includes a parallel lined composition and a backlight composition. The composition database 75 stores compositions suitable for each scene, and may store a brief description about each composition, for example, the feeling of a composition using text.

In the current embodiment, the composition database 75 is included in the DSP 70; however the present embodiment is not limited thereto, and the composition database 75 may be included in the data storage unit 50 of FIG. 1 or in an external non-transient storage medium (not shown). Alternatively, data about compositions may be received from an external device connected via the Internet.

Figure 4:
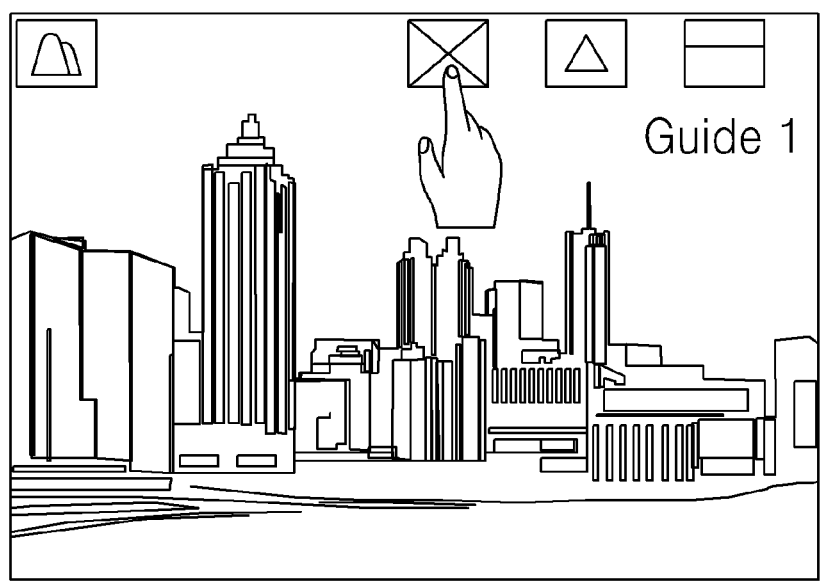
FIGS. 4A through 4C are diagrams for describing a method of updating a composition database, according to an embodiment.

FIGS. 4A through 4C are diagrams for describing a method of updating the composition database 75, according to an embodiment.

Referring to FIG. 4A, compositions stored in the composition database 75 are initialized, and a pattern of a user is not reflected on the compositions.

Referring to FIG. 4B, a scene of a current input image is recognized according to a composition guide selection of the user. An icon indicating scenery is displayed on the upper left of the screen, according to the result of recognizing the scene. Accordingly, three compositions suitable for the scenery, which are a diagonal composition, a triangular composition, and a horizontal composition, are extracted from the compositions stored in the composition database 75, and then displayed on the upper right of the screen. Here, the user selects the diagonal composition.

Referring to FIG. 4C, the compositions stored in the composition database 75 are updated based on the user selections. The number of user selections is reflected on each composition, and the compositions are arranged from left to right in an order of the highest count result to the lowest count result. Thus, as shown in FIG. 4C, the diagonal composition has been selected 10 times, the triangular composition has been selected 8 times, the horizontal composition has been selected 7 times, etc.

The arranged order of the compositions may be according to the frequency of selections according to a scene, or according to the frequency of selections regardless of a scene. Accordingly, during a following photographing, the diagonal composition that has been mostly selected is displayed first to the user, thereby providing compositions according to the preference of the user.

Figure 5:
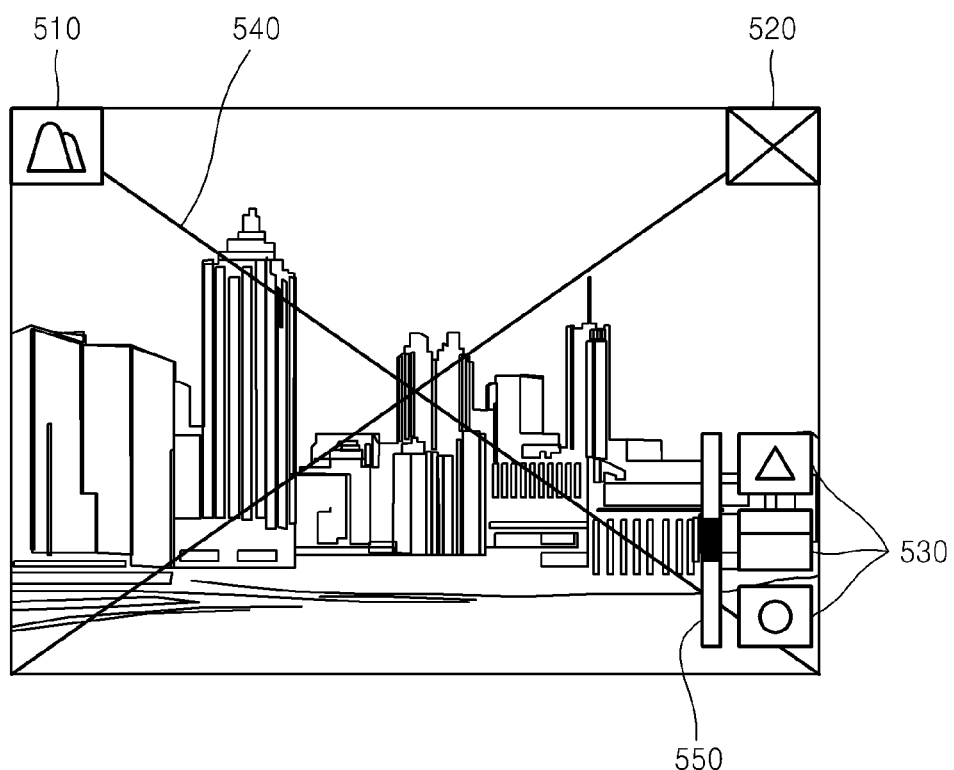
FIG. 5 is a diagram for describing a method of displaying a composition updated in a composition database, according to an embodiment.

FIG. 5 is a diagram for describing a method of displaying a composition updated in a composition database, according to an embodiment.

Referring to FIG. 5, a current input image is recognized to be in a scenery mode, and thus a scene icon 510 according to the scenery mode is displayed. Also, a diagonal composition 540 that is most selected by a user from among compositions related to the scenery mode is displayed as an icon 520 of a representative composition, and the diagonal composition 540 is displayed on a screen. In other words, as shown in FIG. 4C, the diagonal composition stored in the composition database 75 has the highest count value. Candidate compositions, aside from the representative composition or a default setting composition, are indicated in a reference numeral 530, and the candidate compositions are also arranged from top to bottom in an order of a highest count value to lowest count value.

When all of the compositions related to the scenery mode are not displayed on the screen, a scroll bar 550 may be used. Accordingly, when compositions are arranged in an order of most selected to least selected by the user, the user may save time in selecting a composition, and capture an image quickly.

FIGS. 6A through 6D are diagrams for describing a method of updating a composition database according to a user, according to an embodiment.

Figure 6A:
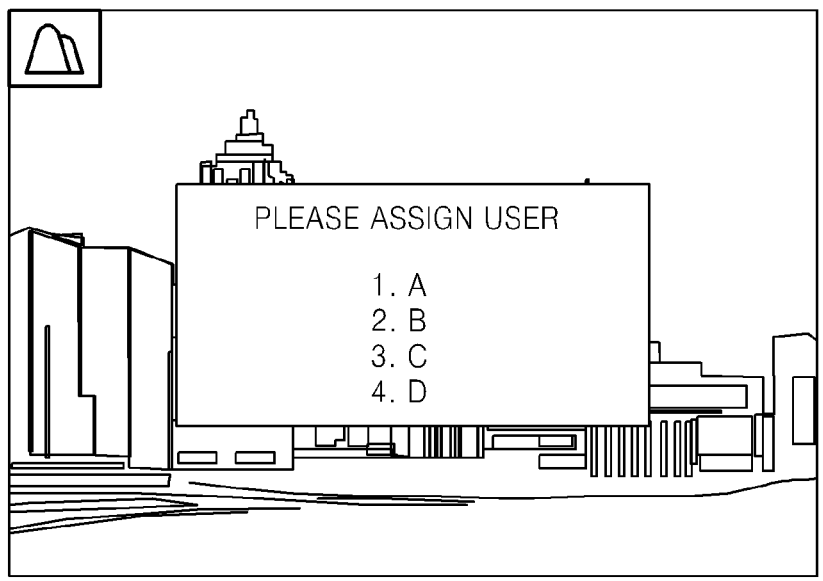
FIGS. 6A through 6D are diagrams for describing a method of updating a composition database according to a user, according to an embodiment.

Referring to FIG. 6A, a menu for assigning a user (hereinafter referred to as 'assign users menu') is displayed on a screen. A certain user is selected from the assign users menu.

Figure 6B:
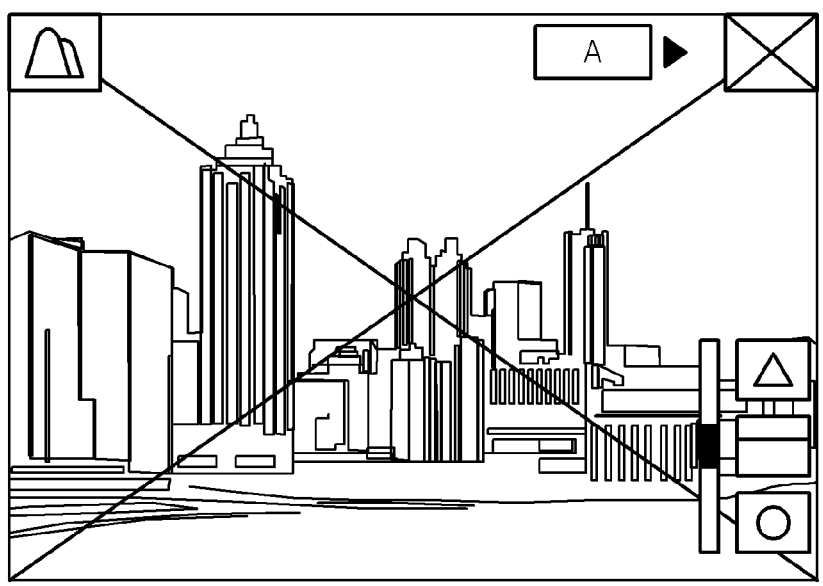

Referring to FIG. 6B, when a user A is selected, a currently selected user is displayed, and an icon for assigning another user is displayed. Icons of compositions are displayed on the right, and may be displayed in an order of most selected to least selected by the user A. The representative composition may be set as the composition most selected by the user A, displayed on the image, and displayed as an icon in the upper right corner of the screen. When another user is to be selected, an additional selection icon shown as an arrow directed in a certain direction on the upper part of the screen can be selected to change a user. An example of selecting a user B by selecting the additional selection icon is displayed on FIG. 6C.

Figures 6C, 6D:
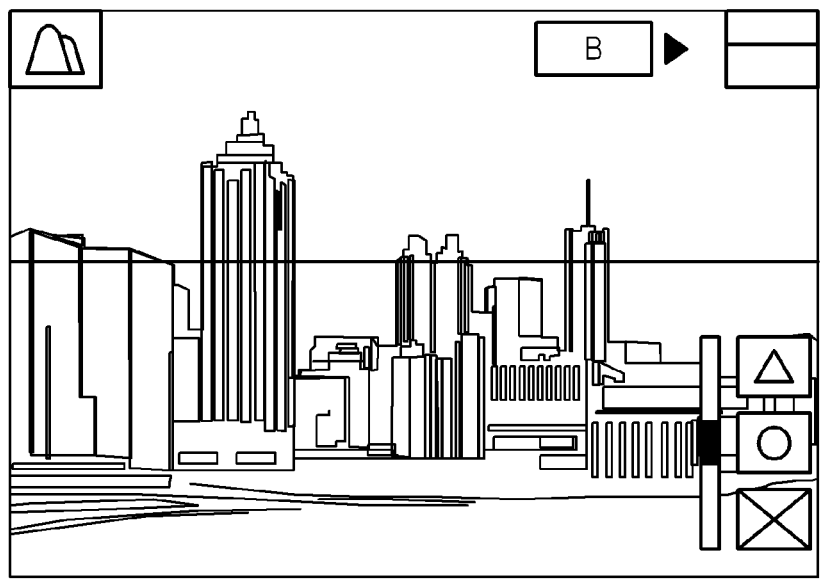

Referring to FIG. 6C, icons of compositions are displayed on the right, and may be displayed in an order of most selected to least selected by the user B. In other words, the representative composition is changed to a horizontal composition, and an order of sub-compositions may also be changed accordingly.

Referring to FIG. 6D, exemplary frequencies of selecting compositions stored in the composition database 75 are shown according to a user. In other words, the user A mostly selected composition 1, and the user B mostly selected composition 2. Accordingly, when compositions are displayed according to each user, the compositions may be displayed in an order of a composition having the highest count value to a composition having the lowest count value, as shown in FIG. 6D.

In FIG. 6A, the assign users menu is provided so as to manually assign the user, but a user may be automatically recognized by using the user recognizing unit 17, thereby updating the composition database 75 according to a user, and displaying a composition preferred by the user.

For example, when face information of a user is input to a digital photographing apparatus by rotating a lens in an optical unit or by using an additional lens, the user is identified by using the face information in a face recognizing method, and compositions according to the identified user are displayed, as shown in FIGS. 6B and 6C.

FIGS. 7A through 7D are diagrams for describing a method of registering a new composition, according to an embodiment.

Figure 7A:
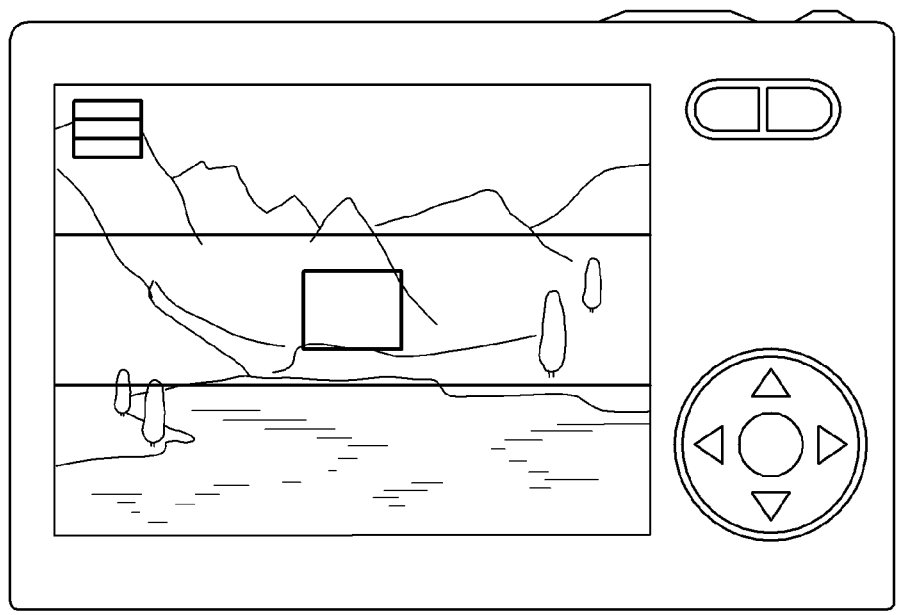
FIGS. 7A through 7D are diagrams for describing a method of registering a new composition, according to an embodiment.

Referring to FIG. 7A, when a user activates a composition function by pressing a certain button included in the digital camera 100, a tri-sectional composition that has been mostly used by the user is extracted from the composition database 75 and displayed first.

Figure 7B:
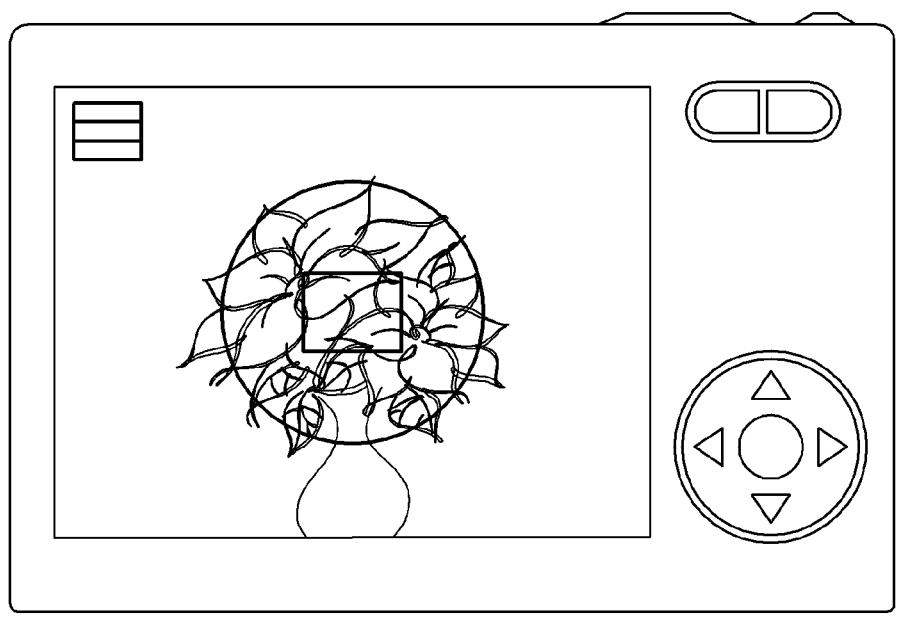

Referring to FIG. 7B, when an image input to the digital camera 100 is a close shot image, a circular composition is displayed.

Figure 7C:
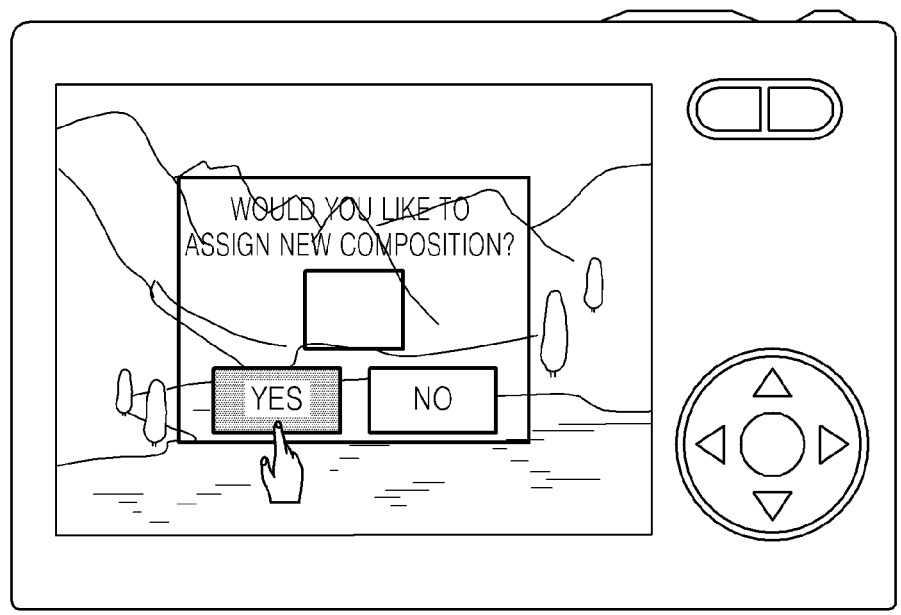
Figure 7D:
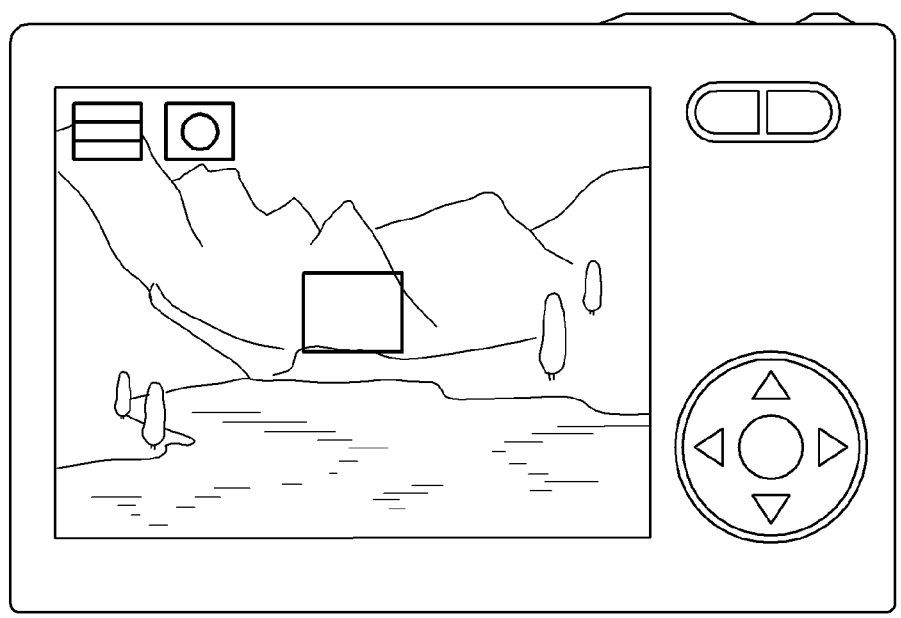

In FIG. 7C, a window asking the user whether the user wants to register a new composition pops up, and a new composition, i.e., the circular composition, is displayed on the upper part of the screen as shown in FIG. 7D, according to the selection of the user.

According to the current embodiment, another composition is registered, aside from the composition mainly used by the user, and the composition mainly used by the user is stored and displayed, thereby providing convenience to the user.

FIG. 8 is a flowchart illustrating a method of updating a composition database, according to an embodiment.

Referring to FIG. 8, a composition guide is set in operation 800. A user may activate a composition guide function by pressing a certain button included in a digital photographing apparatus. In operation 802, at least one composition is extracted from a composition database. The compositions stored in the composition database may be grouped according to a scene or user. In other words, a scene of a current input image is recognized, and compositions suitable for the scene may be extracted or compositions preferred by a currently assigned user may be extracted. In operation 804, the extracted at least one composition is displayed. A composition that is mostly used may be displayed as a representative composition, or compositions that are mostly used after the representative composition may be displayed as sub-compositions with the representative composition, according to the frequency of using the extracted at least one composition until the previous photographing.

In operation 806, whether there is a user selection is determined. In other words, whether there is a composition selected by the user from among the displayed at least one composition is determined. If the user selects a composition, the selected composition is counted in operation 808. In operation 810, the compositions stored in the composition database are updated according to the result of operation 808. In other words, the compositions that are frequently used by the user are displayed first while displaying compositions next time.

Figure 9:
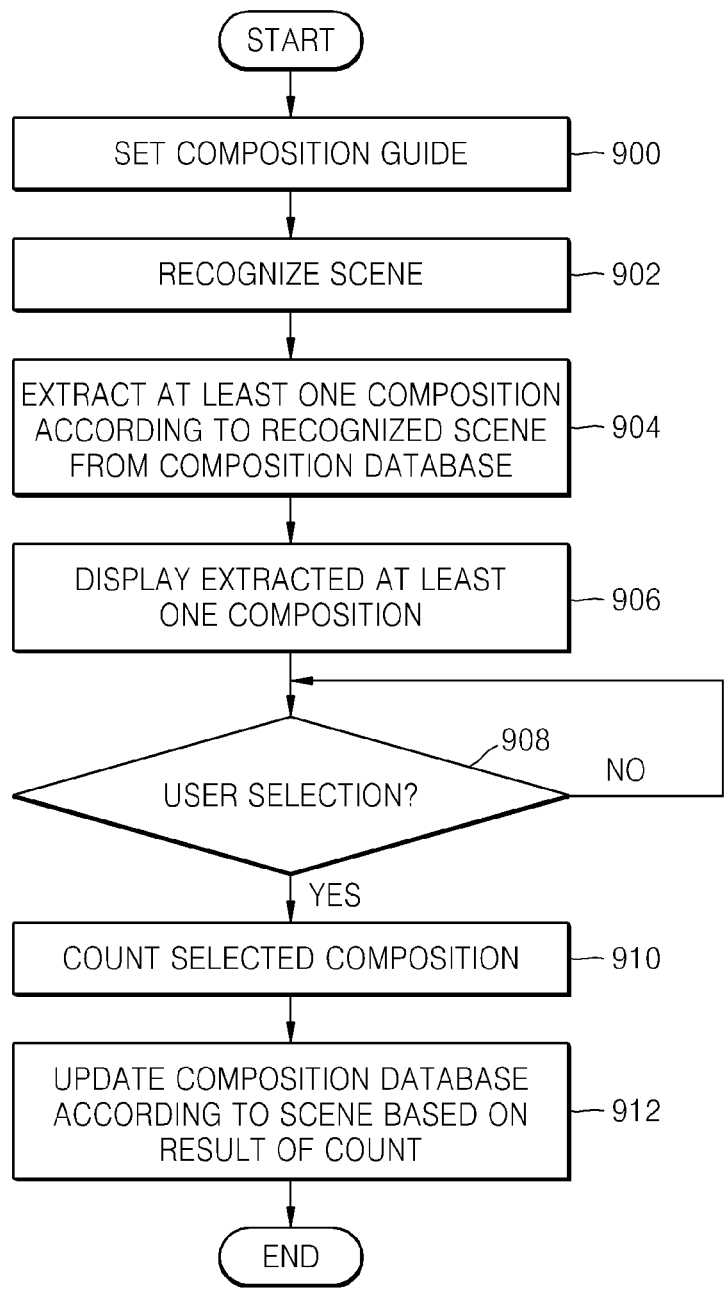
FIG. 9 is a flowchart illustrating a method of updating a composition database, according to another embodiment.

FIG. 9 is a flowchart illustrating a method of updating a composition database, according to another embodiment.

Referring to FIG. 9, a composition guide is set in operation 900. In operation 902, a scene is recognized. Here, it is determined whether an input image is a scenery or a person by analyzing scene information detected from the input image, for example, by analyzing a face of a person in the input image, the brightness of the input image, the illuminance of a subject, and a distance of the subject. Also, a scene icon corresponding to the recognized scene may be selectively displayed on a screen. In operation 904, at least one composition according to the recognized scene is extracted from a composition database, and in operation 906, the extracted at least one composition is displayed. In operation 908, whether there is a user selection is determined. In operation 910, a selected composition is counted. In operation 912, the composition database is updated according to a scene, based on the result of operation 910. In other words, a count value of the selected composition is increased in the composition database in which compositions are grouped according to a scene.

In FIG. 9, the composition database is updated according to a scene; however the composition database may be updated according to a user or according to both a scene and user.

According to a method of updating a composition database, a composition preferred by a user is automatically learned and provided, thereby providing convenience during photographing. Also, since statistical data on compositions preferred by the user is accumulated, a taste of the user and photographing trend may be analyzed.

Also, a composition may not be manually set according to circumstances, and by displaying the most preferred composition, time may be saved while capturing an image according to a taste of the user.

The above embodiments are described with respect to a digital camera, which is an example of a photographing apparatus, but the embodiments also apply to a camera phone having a camera function, a personal digital assistant (PDA), and a portable multimedia player (PMP).

Embodiments may include software modules which may be recorded and stored as program instructions or computer readable codes executable by a processor on non-transitory computer readable storage media such as read-only memory (ROM), random-access memory (RAM), CD-ROMs, magnetic tapes, floppy disks, and optical data storage devices. The computer readable storage medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. It will be recognized that the terms "comprising," "including," and "having," as used herein, are specifically intended to be read as open-ended terms of art. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A method of updating a composition database for storing information for setting a composition, the method comprising:
   extracting and displaying at least one composition stored in the composition database;
   updating a count for a frequency of selecting a composition in response to a composition selection signal from among the at least one composition; and
   updating the composition database according to the result of updating the count,
   wherein the composition indicates an arrangement of subjects in an image, and
   wherein, in the updating, an arranged order of compositions according to a scene in the composition database is updated according to the result of the count.

2. The method of claim 1, wherein more than one composition is stored in the composition database in an order from a composition having the highest count result to a composition having the lowest count result, and the updating comprises changing an arranged order of the compositions stored in the composition database.

3. The method of claim 2, further comprising repeating the extracting and displaying, wherein the at least one composition is displayed according to the changed arranged order.

4. The method of claim 2, wherein, in the extracting and displaying, a composition having the highest count result is displayed as a representative composition.

5. The method of claim 4, wherein, in the extracting and displaying, the remaining compositions, excluding the composition having the highest count result, are displayed as sub-compositions.

6. The method of claim 1, further comprising:
   detecting scene information from an input image, and
   recognizing a scene of the input image by using the detected scene information,
   wherein, in the extracting and displaying, at least one composition corresponding to the recognized scene is extracted from the composition database and displayed.

7. The method of claim 1, further comprising:
   selecting a certain user by assigning a user or by using a predetermined user recognizing device,
   wherein, in the extracting and displaying, at least one composition corresponding to the selected user is extracted from the composition database and displayed.

8. The method of claim 7, wherein, in the updating, an arranged order of compositions according to a user in the composition database is updated according to the result of updating the count.

9. The method of claim 6, further comprising:
   selecting a certain user by assigning a user or by using a predetermined user recognizing device,
   wherein, in the extracting and displaying, at least one composition corresponding to the recognized scene and the selected user is extracted from the composition database and displayed.

10. The method of claim 9, wherein, in the updating, an arranged order of compositions according to a scene and according to a user in the composition database is updated according to the result of updating the count.

11. The method of claim 1, further comprising:
    selecting another composition other than the displayed at least one composition,
    wherein the selecting is performed by a user, and displaying the other selected composition; and
    registering the other selected composition in the composition database.

12. A non-transient computer readable storage medium having stored thereon a program executable by a processor for performing a method of updating a composition database for storing information for setting a composition, the method comprising:
    extracting and displaying at least one composition stored in the composition database;
    updating a count for a frequency of selecting a composition in response to a composition selection signal from among the at least one composition; and
    updating the composition database according to the result of updating the count,
    wherein the composition indicates an arrangement of subjects in an image, and
    wherein, in the updating, an arranged order of compositions according to a scene in the composition database is updated according to the result of the count.

13. An apparatus for updating a composition database for storing information for setting a composition, the apparatus comprising:
    a controller that stores and displays at least one composition stored in the composition database, and updates a count for a frequency of selecting a composition in response to a composition selection signal from among the at least one composition; and
    a composition updater that updates the composition database according to the result of the count, wherein the composition indicates an arrangement of subjects in an image, and wherein, in the updating, an arranged order of compositions according to a scene in the composition database is updated according to the result of the count.

14. The apparatus of claim 13, wherein more than one composition is stored in the composition database, in an arranged order from a composition having the highest count result to a composition having the lowest count result and the composition updater changes the arranged order.

15. The apparatus of claim 14, wherein after the arranged order is changed the controller displays compositions in the changed arranged order.

16. The apparatus of claim 14, wherein the controller displays the composition having the highest count result as a representative composition, and displays remaining compositions, excluding the composition having the highest count result, as sub-compositions.

17. The apparatus of claim 13, further comprising:
a scene recognizer that detects scene information from an input image and recognizes a scene of the input image by using the detected scene information,
wherein the controller extracts at least one composition corresponding to the recognized scene and displays the extracted at least one composition.

18. The apparatus of claim 13, wherein the controller, when a certain user is selected by assigning a user or by using a predetermined user recognizing device, extracts at least one composition corresponding to the selected user from the composition database and displays the extracted at least one composition.

19. A digital photographing apparatus comprising:
an apparatus for updating a composition database for storing information for setting a composition, the apparatus comprising:
a controller that stores and displays at least one composition stored in the composition database, and counts a frequency of a composition selection signal from among the at least one composition; and
a composition updater that updates the composition database according to the result of the count, wherein the composition indicates an arrangement of subjects in an image, and
wherein, in the updating, an arranged order of compositions according to a scene in the composition database is updated according to the result of the count.

* * * * *